United States Patent
Ratcliff et al.

(10) Patent No.: US 7,860,955 B2
(45) Date of Patent: Dec. 28, 2010

(54) SELF-CONFIGURING IP ADDRESSABLE DEVICES UTILIZING TWO ETHERNET PROTOCOL IP PORTS

(75) Inventors: Gregory W. Ratcliff, Ashley, OH (US); Philip R. Aldag, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 171 days.

(21) Appl. No.: 11/952,763

(22) Filed: Dec. 7, 2007

(65) Prior Publication Data

US 2008/0140813 A1    Jun. 12, 2008

Related U.S. Application Data

(60) Provisional application No. 60/869,247, filed on Dec. 8, 2006.

(51) Int. Cl.
G06F 15/177 (2006.01)
(52) U.S. Cl. .................................. 709/220; 709/223
(58) Field of Classification Search ............. 709/220, 709/223, 208
See application file for complete search history.

(56) References Cited

U.S. PATENT DOCUMENTS

| | | | |
|---|---|---|---|
| 5,281,859 A | 1/1994 | Burke | |
| 5,424,903 A | 6/1995 | Schreiber | |
| 5,862,393 A | 1/1999 | Davis | |
| 6,410,994 B1 | 6/2002 | Jones et al. | |
| 6,445,087 B1 | 9/2002 | Wang et al. | |
| 6,608,406 B2 | 8/2003 | Bersiek | |
| 6,618,772 B1 | 9/2003 | Kao et al. | |
| 6,711,613 B1 | 3/2004 | Ewing et al. | |
| 6,741,442 B1 | 5/2004 | McNally et al. | |
| 6,744,150 B2 | 6/2004 | Rendic | |
| 6,826,036 B2 | 11/2004 | Pereira | |
| 6,937,461 B1 | 8/2005 | Donahue | |
| 7,010,589 B2 | 3/2006 | Ewing et al. | |
| 7,043,543 B2 | 5/2006 | Ewing et al. | |
| 7,099,934 B1 | 8/2006 | Ewing et al. | |
| 7,141,891 B2 | 11/2006 | McNally et al. | |

(Continued)

FOREIGN PATENT DOCUMENTS

EP    1081921    3/2001

(Continued)

OTHER PUBLICATIONS

Jorg Riegler, International Search Report for International Patent Application No. PCT/US2007/086810, European Patent Office, Germany.

(Continued)

*Primary Examiner*—Lashonda T Jacobs
*Assistant Examiner*—Marshall McLeod
(74) *Attorney, Agent, or Firm*—Locke Lord Bissell & Liddell LLP

(57) ABSTRACT

The present invention is related to a method and apparatus for monitoring and controlling devices comprising connecting an external manager to a communication protocol, connecting a first device to the external manager, assigning an IP address to said first device publishing a second IP address from the first device, connecting a second device to said first device such that it obtains the said second IP address, publishing a third IP address from said second device.

17 Claims, 3 Drawing Sheets

U.S. PATENT DOCUMENTS

| | | |
|---|---|---|
| 7,162,521 B2 | 1/2007 | Ewing et al. |
| 7,171,461 B2 | 1/2007 | Ewing et al. |
| 7,196,900 B2 | 3/2007 | Ewing et al. |
| 7,268,998 B2 | 9/2007 | Ewing et al. |
| 2003/0122683 A1 | 7/2003 | Downer |
| 2004/0165358 A1 | 8/2004 | Regimbal et al. |
| 2004/0178270 A1 | 9/2004 | Pradhan et al. |
| 2004/0231875 A1* | 11/2004 | Rasmussen et al. ........... 174/50 |
| 2005/0203987 A1* | 9/2005 | Ewing et al. ................ 709/200 |
| 2005/0259383 A1 | 11/2005 | Ewing et al. |

FOREIGN PATENT DOCUMENTS

| | | |
|---|---|---|
| WO | 9310615 | 5/1993 |
| WO | 0069081 | 11/2000 |

OTHER PUBLICATIONS

Jorg Riegler, Written Opinion for International Patent Application No. PCT/US2007/086810, European Patent Office, Germany.

B. Levine and A. Swales. "Wanted: IP addresses for factory network devices! & Software solution for industrial IP addressing task." The Industrial Ethernet Book, Jan. 2004, Issue 18.

International Search Report for International Patent Application No. PCT/US2007/086809.

Written Opinion for International Patent Application No. PCT/US2007/086809.

Ellen Moyse, International Patent Report on Patentability for International Patent Application No. PCT/US2007/086810, dated Jun. 18, 2009, The International Bureau of WIPO, Switzerland.

Ellen Moyse, International Patent Report on Patentability for International Patent Application No. PCT/US2007/086809, dated Jun. 18, 2009, The International Bureau of WIPO, Switzerland.

* cited by examiner

SELF-CONFIGURING IP ADDRESSABLE DEVICES UTILIZING TWO ETHERNET PROTOCOL IP PORTS

CROSS REFERENCE TO RELATED APPLICATIONS

This application claims benefit of and priority to U.S. provisional patent application Ser. No. 60/869,247, filed on Dec. 8, 2006, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to linking together devices in an IP connected system; and more specifically related to linking together self-configuring IP addressable devices utilizing two Ethernet protocol IP ports.

2. Description of the Related Art

Many IT and networking centers are experiencing higher load densities as more and more equipment is packed into cabinets and racks. As this occurs, there becomes and increasing need to monitor and manage the power supplied to each and all of these loads.

IT and Facility Managers have the basic need reliably and efficiently to distribute power in the rack or cabinet to the equipment. Depending on application and requirements, these users have some differences with respect to the functionality and connectivity of their devices. In general, these needs are classified by the capabilities of the physical device, its functional behavior, its network infrastructure and its software management models. Furthermore, these market needs are addressed by certain expected product requirements.

One prior art solution has been to link devices, such as power distributing devices, including, but to limited to power strips, that are desired to be monitored and controlled, to an Internet protocol (IP)-based system that allows a user to monitor and control the devices from a computer. Such IP-based systems typically require configuration to allow multiple devices to operate cooperatively on an IP network. In an exemplary prior art solution, each successively added device is given a new IP connection to an external connection manager. One such prior art example is the MP Advanced power strips with OpenComms EM PDU as sold by Liebert Corporation. Another prior art example is the MP Advanced power strips with the Ethernet-based MP Advanced Access Server. Both products are available from Liebert Corporation.

While each of these products has been successful and provides more than adequate monitoring and control, it can sometimes be difficult to add devices to the preexisting system. For example, power strips are often mounted inside a cabinet, behind the racked equipment. Once the equipment is connected to the rack and the power strip is connect to the monitoring server (such as the MP Advanced Access Server), the cabinet and equipment are ready for use. In order to add an additional power strip to meet the additional power demands of additional equipment, the pre-existing equipment usually must be removed to add the new power strip and to connect the strip directly to the server.

An additional improvement needed upon the prior art is the ability to recognize the connectivity relationship between various devices. In the prior art, generally, a device, such as a power strip, is plugged into a server network hub or switch. Once the device has been plugged in, it is given a specific IP address. As additional devices are added, each device must be connected to the same server network hub or switch. Each additional device is given its own specific IP address. This requires assigning and reassigning IP addresses as devices are added. This results in an inability to easily recognize where each strip is connected, how it is configured, and what specific equipment is controlled.

Some other prior art products do not use the Ethernet protocol. Instead, they use other types of connectivity. For example, some utilize a concentrator in which devices are plugged into multiple telephone type jacks. The central concentrator is given one IP address, and, therefore, it is not known where each device is or how it is configured. Thus, there is a need to accurately determine the location of each device added to an IP network and their relationship to each other.

There are numerous advantages to being able to control and monitor the power to all loads (devices attached to a power strip). In particular, monitoring and controlling power to certain loads is advantageous to IT and network managers who are experiencing high electrical power densities and looking for a way to monitor and manage loads at the power strip and receptacle level in the data center or network closet. This ability is also advantageous to facility managers who want to control panel board utilization and protect against inadvertent overloading.

The invention disclosed and taught herein is directed to an improved system for controlling and monitoring interconnected devices, specifically using self-configuring IP addressable devices utilizing two Ethernet protocol IP ports. By utilizing a lower level input and output port, the network is self-determining and the nodes become aware that they are physically connected together and form an affinity to each other. This allows IP based products to understand how they are physically wired, such as, for example, within a Local Area Network (LAN).

BRIEF SUMMARY OF THE INVENTION

The present invention is related to a method and apparatus for monitoring and controlling devices comprising and connecting an external manager to a communication protocol, connecting a first device to the external manager, assigning an IP address to said first device publishing a second IP address from the first device, connecting a second device to said first device such that it obtains the said second IP address, publishing a third IP address from said second device. The process can be repeated as necessary.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

In general, Applicants have created a method and apparatus for monitoring and controlling devices comprising connecting an external manager to a communication protocol, connecting a first device to the external manager, assigning an IP address to the first device, publishing a second IP address from the first device, connecting a second device to the first device such that it obtains the second IP address, and publishing a third IP address from the device. The process can be repeated as necessary. By utilizing a single port with lower level input and output ports, the network is self-determining in that the devices report that they are physically connected together and form an affinity to each other. This allows IP-based devices to register how they are physically wired, for example, within a Local Area Network (LAN).

Figure 1:
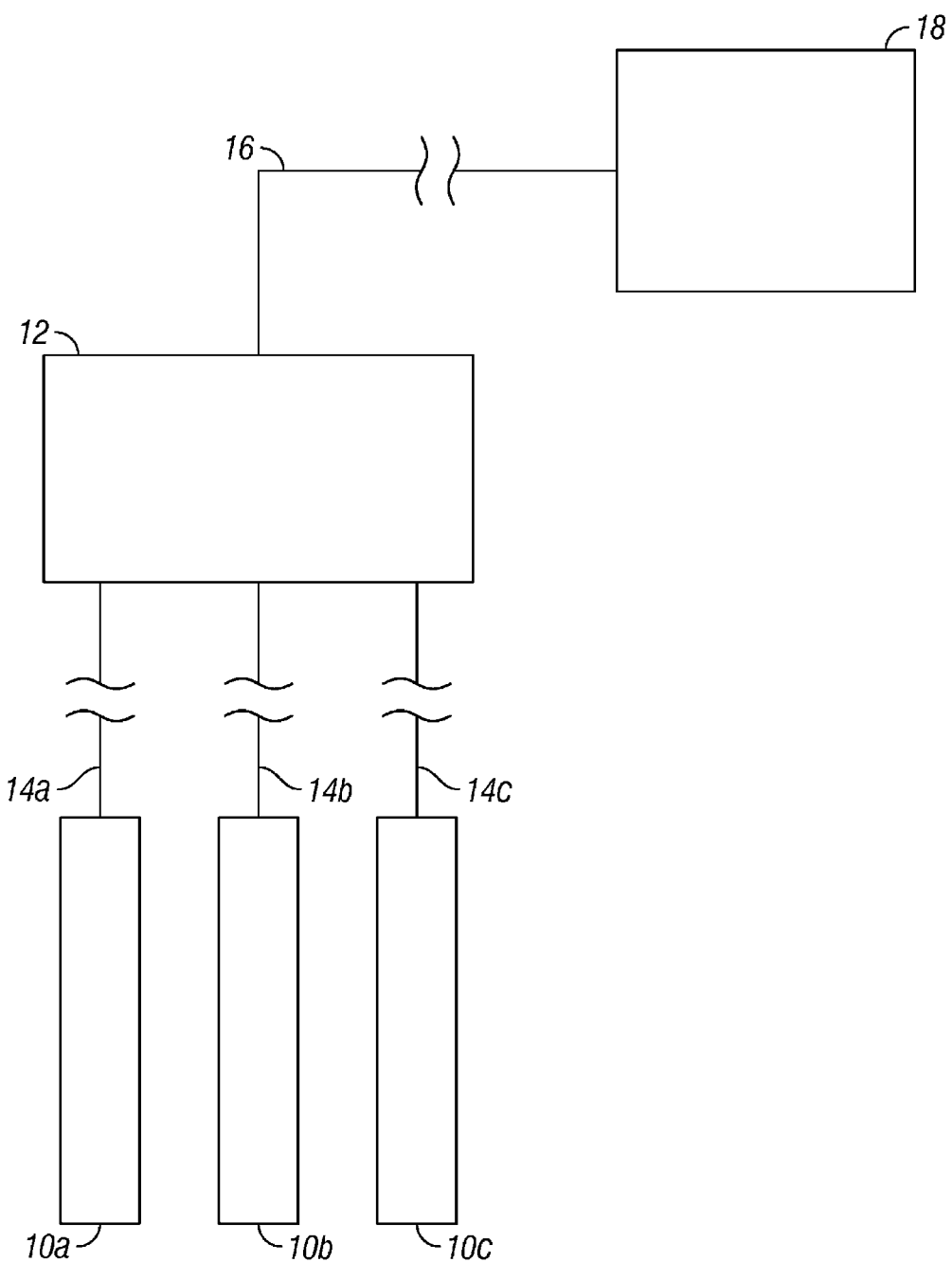
FIG. 1 illustrates a prior art example of connecting multiple devices to an external manager.

FIG. 1 is an illustration of a prior art example of connecting multiple devices to an external manager to configure, monitor, and control the devices. The devices 10 a, b, c, such as, for example, power strips, are connected to an external manager 12, such as a server. The connections between devices 10 a, b, c and the external manager 12 are generally accomplished via a data communication connection 14 a, b, c, including but not limited to an Ethernet link. The external manager 12 is connected 16 to a communication protocol 18 such as the Internet, a Simple Network Management Protocol (SNMP), or a Local Area Network (LAN). Each of the devices 10 a, b, c is given a unique top-level IP address, for example, 192.168.1.1. To monitor and control each of the associated devices, the unique IP address of each must be known. Knowing the address, a user can access the external manager 12 across the communications protocol 16. From the external manager 12, the user can then monitor and control one or more of the unique devices 10 a, b, c.

Figure 2:
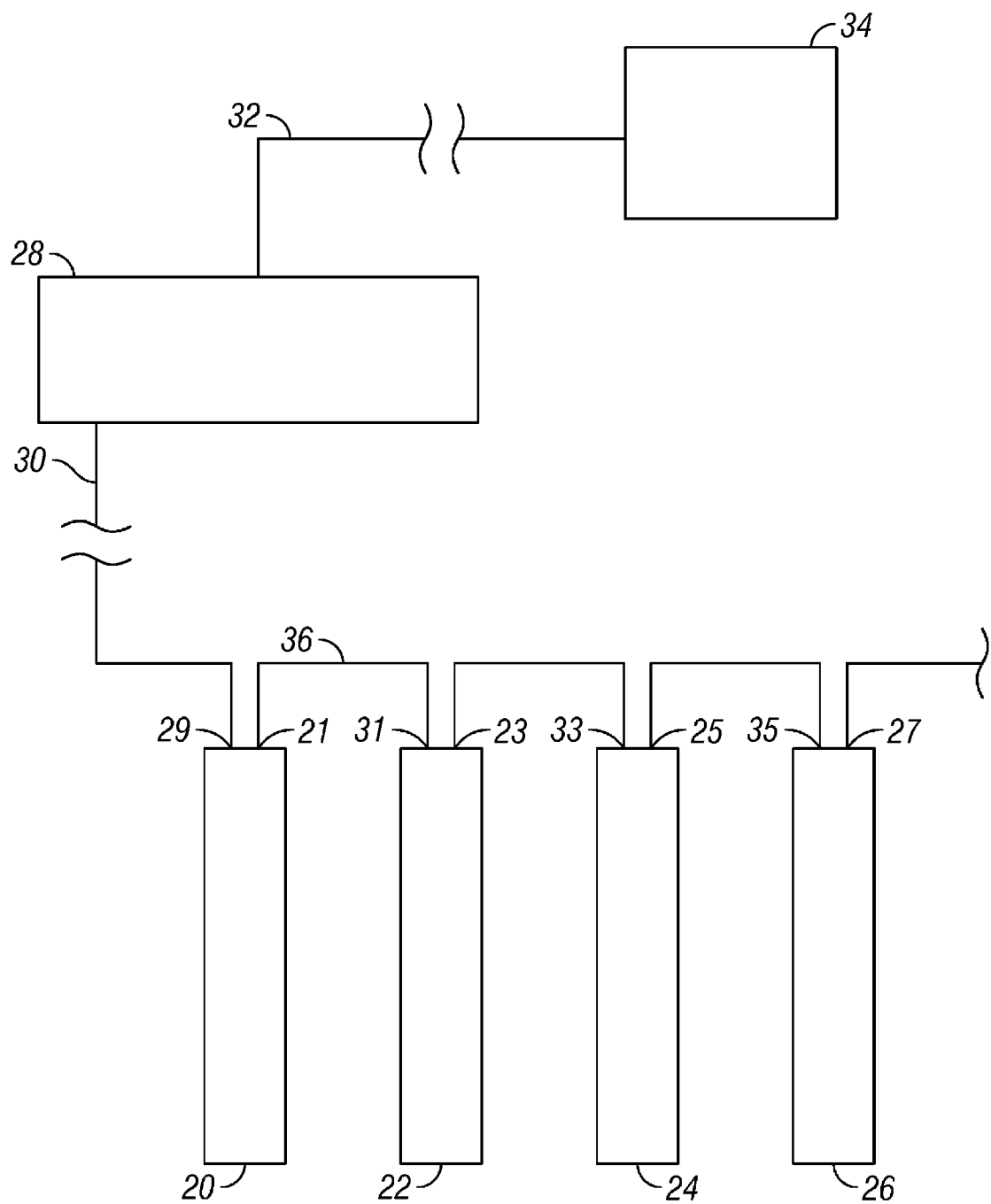
FIG. 2 illustrates an embodiment of the current invention wherein four devices are interconnected.

FIG. 2 illustrates an embodiment of the current invention in which four devices 20, 22, 24, 26, such as, but not limited to, power strips, are interconnected. Other devices contemplated by this invention include, but are not limited to, Uninterrupted Power Supplies, Breaker Panels and Static Switches. Further, while the figure depicts four devices it is contemplated that any number of devices can be combined using the current invention. The first device 20 is connected to an external manager 28 via a communication link 30, such as an Ethernet system, at communication port 29. The external manager 28 is connected 32 to a communications protocol 34, such as the Internet, a Simple Network Management Protocol (SNMP), or a Local Area Network (LAN). First device 20 is assigned a unique top-level IP address, for example, 192.168.1.1. First device 20 further generally has access to the communications protocol 34 through the external manager 28, and is not connected to any additional control or monitor equipment. This allows device 20 to function as device manager. First device 20 further publishes an IP sub-node address, such as 10.1.1.1, for example, at an Ethernet port 21.

Second device 22 can then be connected to first device 20. The connection is generally accomplished through an Ethernet connection 36 between port 21 and port 31. The second device 22 is identified as a "slave" unit and, when connected to the first device, obtains a sub-node IP address of 10.1.1.1, for example, as well as further publishes an IP sub-node address, such as 10.1.1.2, for example on an Ethernet jack 23. The second device 22 will then publish a third sub-node IP address, such as 10.1.1.3. This process is repeated for each successive device added (i.e. devices 24 and 26) but is not limited in number.

In the above example, each device added is self-configuring in nature. Each device (20, 22, 24, and 26) is equipped with two communication ports (e.g. Ethernet ports), nominally input and output. Each device routes data bi-directionally between other devices utilizing knowledge gained about architecture and cabling configuration through "input to output" cabling. The network is self-configuring, as are the master and slave devices, through the use of Ethernet routing tables to match physical connections to network displays and protocols. For example, each additional connection creates a sub-node address, which is then routable back and forth through the devices connected to each other. This allows the devices to register which node is above them in the chain and which node is below them. With this network configuration being known by all devices, this group of devices can associate themselves together and self-organize into a group of cooperative devices automatically. This eliminates the need to assign and reassign IP addresses as devices are added, but also allows the devices to relate characteristics together.

A preferred method for resolving the addresses of the devices is by utilizing the SMBus specification which defines a method to dynamically assign addresses to devices connected to a communications bus. The method is described in section 5.6 of the SMBus specification. The SMBus is an industry standard defined by Intel. It is built on the I2C bus specification. The SMBus specification has a network layer in addition to the data link and physical layer specified by the I2C bus that defines a standard protocol for transferring data between devices on the SMBus.

Figure 3:
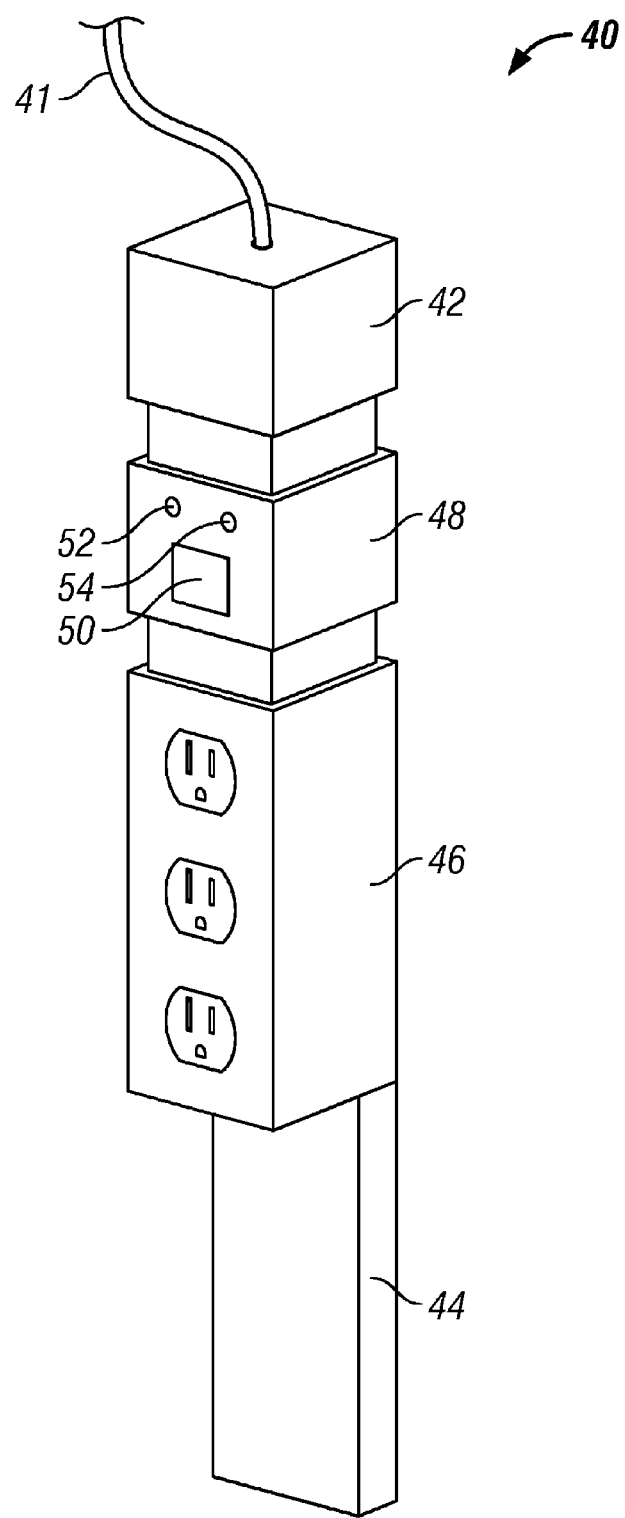
FIG. 3 illustrates an embodiment of a device, shown as an advanced power strip, for use in connection with this invention.

FIG. 3 illustrates an embodiment of a self-configuring device in accordance with the present invention. In particular FIG. 3 shows an advanced power strip 40, however other devices are contemplated such as Uninterrupted Power Supplies, Breaker Panels and Static Switches. The advanced power strip 40 shown in FIG. 3 generally comprises three components. The first component is the power bus, which is the basis for input power delivery 41 and is comprised of the integration of the input power connection 42 and power distributor 44. The second component is one or more receptacles 46. The one or more receptacles 46 are for output power distribution, and includes all capacity, and optional monitoring, and control functions. The third component is a communication section 48 for powered equipment management and control and may include a local display 50 and environmental monitoring functions.

The Communication section 48 can be adapted to provide communicative connectivity, such as through an Ethernet link, for a public communication link to the advanced power strip 40 and to establish a private communication link with the installed sections (i.e. 42, 44, 46, 48). Communication section 48 can be adapted to support basic local environmental monitoring.

The communication section 48 further comprises at least one communications port and preferably at least two, nominally input 52 and output 54. The input ports are also depicted in FIG. 2 as 29, 31, 33, and 35. The output ports are depicted in FIG. 2 as 21, 23, 25 and 27. The communications ports can be adapted to provide support for both IEEE 802.3 compliant 10 Base T, 100 BaseT and Gigbit Ethernet networks, or other communication protocol. The communications ports 52 and 54 are preferable dual RJ-45 modular connectors. Furthermore, the communication section 48 may be adapted to provide support as a powered device (PD) for Power-Over-Ethernet operation for the 100 BaseT port.

A preferred embodiment of the system of advanced power strips has the powers strips connected through the communication sections. The communication section that is attached to the external network through its Ethernet connection would be the master communication section. An advanced power strip cluster or rack configuration can exist, where a cluster is defined as one master communication section and additional communication sections connected in series using the two Ethernet connections available on each communication section.

The communication section 48 routes data bi-directionally between other devices and utilizes information gained about architecture and cabling configuration through "input to output" cabling. The network is self-configuring, as are the master and slave devices, through the use of Ethernet routing tables to match physical connections to network displays. Each communication section 48 is provided with network address acquisition firmware such as DHCP and static addressing. Furthermore, each communication section 48 is preferably provided with configurable identification of the advanced power strip. Such identifiers could include, but are not limited to the following items: local contact, location, and description. Furthermore, the communication section 48 is preferably provided with support for the current IP specification, and future specification, on all 10/100 Ethernet ports, including IP Version 4 and IP Version 6.

In order to properly control, monitor and configure the advanced power strip 40, each communication section 48 can be adapted to provide configuration for secure, and unsecured, application interfaces and applications that will communicate with the advanced power strip 40. Application interfaces include those known to persons skilled in the art and include HTTPS, Telnet, Configuration File, Velocity, HTTP, SNMPvl, NTP, and Syslog. The applications used to configure, control and monitor the advanced power strip 40 include those known to persons skilled in the art and include Openview—SNMP; Castle Rock SNMP Network Manager—SNMP; Tivoli—SNMP; MKS Korn Shell—Telnet; Windows—Telnet; Windows—Syslog; NetSNMP_SNMP; Linux Shell—Telnet; Internet Explorer—HTTP/HTTPS; Firefox—HTTP/HTTPS; Netscape—HTTP/HTTPS; Mozilla—HTTP/HTTPS; Opera—HTTP/HTTPS; Safari—HTTP/HTTPS.

The master communication section may have the ability to monitor and trend data that can be obtained from various components of the advanced power strip clusters. For example, all of the measurement values available from the receptacle output and power input can be gathered and exported by a communication section. The communication section will continually gather all measurements from the power input and receptacles as well as any subordinate communication sections and supply the most recent values to the communication sections it is subordinate to. A master communication section will continually gather all measurements from the power input and receptacles and subordinate communication sections and supply them to a client when queried for the values (or asynchronously sent via Change-of-Value (CoV) message for a Velocity client that has registered for CoV).

Receptacle and power input measurement data can continuously updated for all of the advanced power strip units in the advanced power strip cluster and are available from the master communication section. This data can be referred to as "real-time measurements." Trend data made available by the advanced power strip cluster to external clients are historical measurements of data. The receptacle and power input data to trend and interval for each trend measurement can be configured by the user. This data can be referred to as "trend measurements" in this document.

Another type of data measurement by the advanced power strip is energy metering. Energy metering is different from the two types of data above in that the measurement is an accumulated value as opposed to a real-time value or a history of real-time values. The energy value must be accumulated for an extended period of time. This data can be referred to as "accumulated energy measurements".

The receptacles of the preferred embodiment 46 provide the AC power distribution. The receptacles 46 are preferably configured with a number of various domestic and international receptacles. The receptacles can be all standard North/Central American, European, and international receptacle types.

Other and further embodiments utilizing one or more aspects of the inventions described above can be devised without departing from the spirit of Applicant's invention. Further, the various methods and embodiments of the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of monitoring and controlling self-configuring IP addressable devices in an IP connected system comprising:
   connecting a first power distribution unit to an external network manager via a communication protocol;
   assigning an IP address to said first power distribution unit, said first power distribution unit configuring itself as a master device based on the connection to the external network manager, said IP address allowing said external network manager to address communications specifically to said first power distribution unit;
   publishing a first sub-node IP address from the first power distribution unit;
   connecting a second power distribution unit to said first power distribution unit such that said second power distribution unit obtains said first sub-node IP address, said second power distribution unit configuring itself as a slave device based on the connection to the first power distribution unit, said first sub-node IP address allowing said external network manager to address communications specifically to said second power distribution unit;
   wherein each of said first power distribution unit and said second power distribution unit is self-configurable as a master device and as a slave device, such that the second power distribution unit reconfigures itself as a master device when connected to the external network manager and assigned the IP address, and the first power distribution unit reconfigures itself as a slave device when connected to the second power distribution unit and obtaining the first sub-node IP address;
   publishing a second sub-node IP address from said second power distribution unit; and
   connecting a third power distribution unit to said second power distribution unit such that said third power distribution unit obtains said second sub-node IP address, said third power distribution unit configuring itself as a slave device based on the connection to the second power distribution unit, said second sub-node IP address allowing said external network manager to address communications specifically to said third power distribution unit;
   wherein the third power distribution unit is self-configurable as a master device and as a slave device, such that said third power distribution unit reconfigures itself as a master device when connected to the external network manager and assigned the IP address, and the second power distribution unit further reconfigures itself as a master device based on the connection to the third power distribution unit, such that said second power distribution unit is configured as both a master device to the third power distribution unit and a slave device to the first power distribution unit.

2. The method of claim 1, wherein the first and second power distribution units comprise one or more of power strips, breaker panels, static switches, and uninterruptible power supplies (UPS).

3. The method of claim 1, wherein the first and second power distribution units communicate information comprising one or more of real-time power usage measurements and power usage trends to said external network manager.

4. The method of claim 1, wherein the communication protocol comprises a local area network (LAN) protocol, an Internet protocol (IP), or a simple network management protocol (SNMP).

5. The method of claim 1, wherein said second power distribution unit is connected to said first power distribution unit via an Ethernet cable.

6. A system for monitoring and controlling self-configuring IP addressable devices comprising:
   a first power distribution unit connected to an external network manager via a communication protocol and assigned a first IP address, said first power distribution unit configuring itself as a master device based on the connection to the external network manager, said IP address allowing said external network manager to communicate specifically with said first power distribution unit; and
   a second power distribution unit connected to said first power distribution unit and assigned a first sub-node IP address, said second power distribution unit configuring itself as a slave device based on the connection to the first power distribution unit, said first sub-node IP address allowing said external network manager to communicate specifically with said second power supply device;
   wherein said first power distribution unit and said second power distribution unit communicate with the external network manager via the same communication protocol, each of said first power distribution unit and said second power distribution unit being self-configurable as a master device and as a slave device, such that the second power distribution unit reconfigures itself as a master device when connected to the external network manager and assigned the IP address, and the first power distribution unit reconfigures itself as a slave device when connected to the second power distribution unit and assigned the sub-node IP address; and
   a third power distribution unit connected to said second power distribution unit and assigned a second sub-node IP address, said third power distribution unit configuring itself as a slave device based on the connection to the second power distribution unit, said second sub-node IP address allowing said external network manager to communicate specifically with said third power distribution unit;
   wherein the third power distribution unit is self-configurable as a master device and as a slave device, such that said third power distribution unit reconfigures itself as a master device when connected to the external network manager and assigned the IP address, and the second power distribution unit further reconfigures itself as a master device based on the connection to the third power distribution unit, such that said second power distribution unit is configured as both a master device to the third power distribution unit and a slave device to the first power distribution unit.

7. The system of claim 6, wherein the first and second power distribution units comprise one or more of power strips, breaker panels, static switches, and uninterruptible power supplies (UPS).

8. The method of claim 6, wherein the first and second power distribution units are configured to communicate information comprising one or more of real-time power measurements and power usage trends to said external network manager.

9. The system of claim 6, wherein the communication protocol comprises one of a local area network (LAN), an Internet protocol (IP), or a simple network management protocol (SNMP).

10. The system of claim 6, wherein said second power distribution unit is connected to said first power distribution unit via an Ethernet cable.

11. The system of claim 6, wherein at least one power distribution unit comprises a power receptacle and further comprising:

a power bus connected to the power receptacle; and a communication section connected to the power receptacle.

12. The system of claim 11 wherein the communication section further comprises at least one communications port.

13. The system of claim 12 wherein the at least one communications port is a RJ-45 connector.

14. The system of claim 11, wherein said communication section is adapted to provide support as a powered device for Power-Over-Ethernet operation.

15. The system of claim 11, wherein the at least one power distribution unit is a power strip.

16. The system of claim 1, wherein the first power distribution unit is assigned the IP address automatically.

17. The system of claim 6, wherein at least one of the power distribution units is assigned the IP address or the sub-node IP address automatically.

* * * * *